No. 722,379. PATENTED MAR. 10, 1903.
H. P. OLER.
TROLLEY POLE.
APPLICATION FILED AUG. 9, 1902.
NO MODEL.
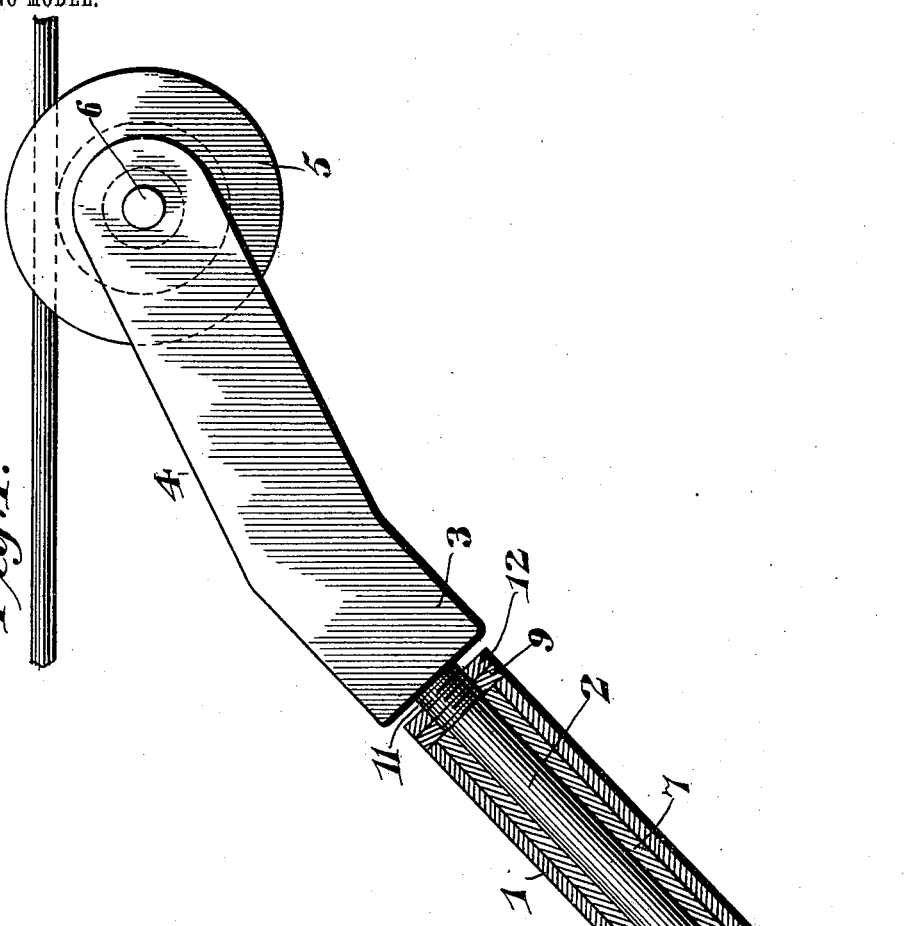
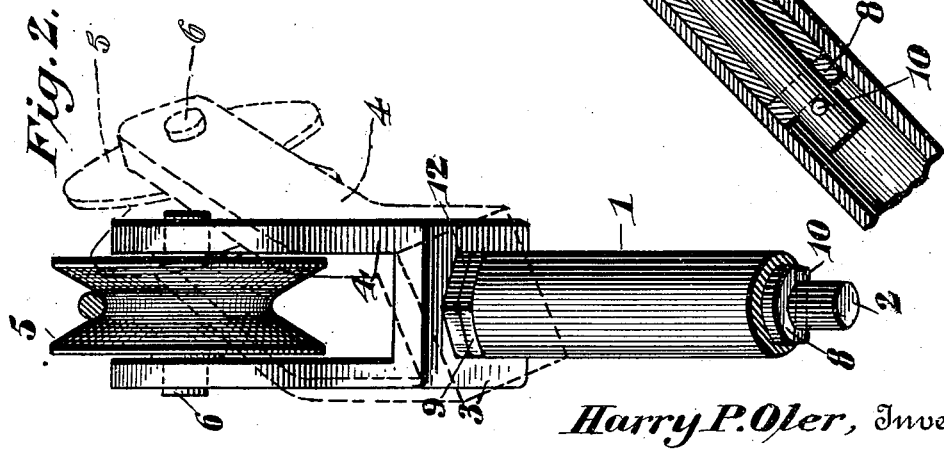
Harry P. Oler, Inventor
Witnesses

UNITED STATES PATENT OFFICE.

HARRY PHILIP OLER, OF CAMDEN, NEW JERSEY, ASSIGNOR OF ONE-HALF TO JOSEPH DAVIS, OF CAMDEN, NEW JERSEY.

TROLLEY-POLE.

SPECIFICATION forming part of Letters Patent No. 722,379, dated March 10, 1903.

Application filed August 9, 1902. Serial No. 119,134. (No model.)

*To all whom it may concern:*

Be it known that I, HARRY PHILIP OLER, a citizen of the United States, residing at Camden, in the county of Camden and State of New Jersey, have invented a new and useful Trolley-Pole, of which the following is a specification.

My present invention relates to a novel trolley-pole, but more particularly to the construction and mounting of the head in which the trolley-wheel is supported.

Ordinarily the trolley-wheel is so mounted at the upper end of the pole that the axis of the pole intersects the axis of the wheel, the result being that any bodily movement of the wheel to accommodate deflections of the wire must be accompanied by corresponding bodily movement of the pole, and if the deflection of the wire is abrupt, although slight, the weight of the pole prevents prompt response to the effort made by the wheel to keep the wire, and the result is that the trolley leaves the wire. The swiveling of the head does not overcome the difficulty, because the axes of the trolley and head being in intersecting relation the only independent movement of the trolley is a turning movement on an axis disposed at an angle to its axis of rotation.

The object of my invention is to provide for limited independent lateral movement of the trolley, so that it may automatically accommodate itself to sudden deflections or abrupt turns in the wire without requiring corresponding lateral movement of the trolley-pole.

To the accomplishment of this object the invention consists in providing a novel form of swiveled mounting for the trolley-head and in disposing the trolley at the upper end of the head with its axis out of intersecting relation with the axis upon which the head rotates.

In the accompanying drawings, in which I have illustrated the preferred embodiment of the invention, Figure 1 is a sectional elevation showing the construction and mounting of the head and the relation of the trolley to the pole, and Fig. 2 is a front elevation showing in dotted lines the position of the trolley when moved laterally independently of the pole.

Like numerals of reference are employed to designate corresponding parts in both views.

The trolley-pole 1 is of tubular form, as usual, and is designed to be mounted upon the car in any approved manner. Disposed coaxially within the pole 1 at the upper end thereof is a spindle 2, extending from the lower end of the head 3, formed, as usual, with a yoke 4, between the arms of which is disposed the trolley or wheel 5, having its axle 6 journaled in the upper ends of the arms of the yoke. The spindle 2 is of less diameter than the bore of the pole and is surrounded by a long cylindrical bushing 7, disposed between a washer 8 and a nut 9. The washer 8 rests upon a pin 10, passed transversely through the spindle 2 adjacent to its lower end, and the nut 9 engages a threaded portion 11 of said spindle, disposed between the bushing and the adjacent end of the head 3. 12 indicates a lock-nut screwed upon the threaded portion 11 of the spindle behind the nut 9 to prevent the accidental rotation of the latter. This arrangement of parts provides a comparatively long bearing for the swiveled mounting of the head, and while making the head readily removable from the pole insures its rotation with comparatively slight friction. This mounting of the head, embodying as it does a durable and substantially antifrictional construction, constitutes one of the features of the invention; but another and, perhaps, more important characteristic of the structure is the rearward deflection of the upper end or yoke portion of the head from the line of the pole. As best shown in Fig. 1, the yoke portion of the head is disposed at an angle to the axis thereof to dispose the axis of the trolley 5 out of intersecting relation with the axis upon which the head rotates. The result is that when a sudden deflection or an abrupt turn in the wire is encountered the trolley will yield bodily with the head, the latter turning on its axis to accommodate such movement. It will be seen that this lateral movement of the trolley is entirely independent of any corresponding movement of the pole and that the disconnection of the trolley from the wire, which is ordinarily caused by the slow response of the pole, is entirely obviated by my invention.

It will of course be evident that the construction, which permits bodily lateral movement of the trolley independently of the pole proper, may be varied within wide limits, the prime requisite being the mounting of the trolley with its axis out of intersecting relation with the axis of the member upon which it is supported. Therefore, while the invention specifically comprehends a trolley-pole provided with a head, it is obvious that in a broader aspect the head may be said to constitute a section of the trolley-pole. In certain of the claims, therefore, I shall define the pole as comprising coaxial sections, one of which is rotary and supports the trolley with the axis of the latter out of intersecting relation with the axis of the rotary section.

It is thought that from the foregoing the construction and arrangement of my trolley-pole and the advantages accruing therefrom will be readily apparent; but, while the present embodiment of the invention is thought at this time to be preferable, I wish to reserve the right to effect such changes, modifications, and variations of the illustrated structure as may be fairly embraced within the scope of the protection prayed.

What I claim is—

1. The combination with a trolley-pole, of a head rotatable about an axis in line with the pole and having a rigid rearwardly-extended upper portion, and a trolley carried by the rearwardly-extended portion of the head.

2. The combination with a trolley-pole, of a head rotatable about an axis in line with the pole and having rigid rearwardly-extended arms, and a trolley mounted between the arms.

3. The combination with a hollow trolley-pole, of a head having a spindle extended into the upper end of the pole and disposed in line therewith, said head having a rigid rearwardly-extended portion, and a trolley mounted in said rearwardly-extended portion with its axis out of intersecting relation with the axis of the spindle.

4. The combination with a hollow trolley-pole, of a head having a spindle extended into the upper end of the pole and arms extending at an angle to the pole, and a trolley mounted between said arms.

5. The combination with a hollow trolley-pole and a head, of a trolley carried by the head, a spindle extending into the pole from the head, and a cylindrical bushing interposed between the spindle and the trolley-pole.

6. The combination with a hollow trolley-pole, and a head carrying a trolley, of a spindle fixed to the head and extending into the pole therefrom, a cylindrical bushing surrounding the spindle, a washer opposed to one end of the spindle, a pin passed through the spindle to retain the washer, and a nut screwed upon the spindle and imposed against the upper ends of the bushing and trolley.

7. The combination with a hollow trolley-pole, and a head carrying a trolley, of a spindle fixed to the head and extending into the pole therefrom, a cylindrical bushing surrounding the spindle, a washer opposed to one end of the spindle, a pin passed through the spindle to retain the washer, a nut screwed upon the spindle and imposed against the upper ends of the bushing and trolley, and a lock-nut screwed upon the spindle to retain the first-named nut against rotation.

In testimony that I claim the foregoing as my own I have hereto affixed my signature in the presence of two witnesses.

HARRY PHILIP OLER.

Witnesses:
JOSEPH DAVIS,
A. C. KRAFT.